Figure 1:
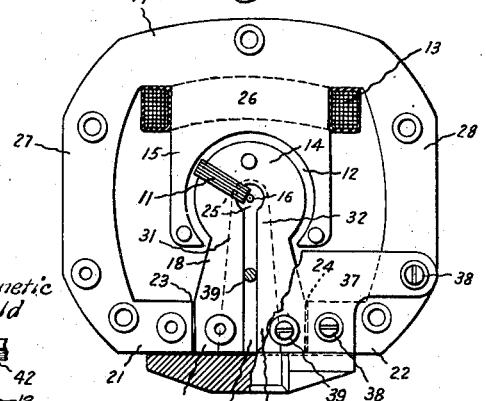

Oct. 15, 1940.  A. J. CORSON  2,218,376

DYNAMOMETER INSTRUMENT

Filed Oct. 25, 1938

Fig.4. Magnetic Shield

Inventor:
Almon J. Corson,
by Harry E. Dunham
His Attorney.

Patented Oct. 15, 1940

2,218,376

UNITED STATES PATENT OFFICE 2,218,376

DYNAMOMETER INSTRUMENT

Almon J. Corson, Swampscott, Mass., assignor to General Electric Company, a corporation of New York Application October 25, 1938, Serial No. 236,891

5 Claims. (Cl. 171—95)

My invention relates to current responsive instruments and concerns particularly instruments and current responsive devices of the dynamometer type.

It is an object of my invention to provide in an electrical instrument a long or wide-angle scale.

Furthermore it is an object of my invention to provide such an instrument in which the scale is relatively uniform throughout its length.

Another object of my invention is to provide a high torque current responsive device and to provide a construction in which iron cores may be used for the current conducting coils to increase the available magnetic flux.

Still another object of my invention is to provide a current responsive device which is suitable for either direct current or alternating current and in which electromagnets are available for producing the magnetic flux.

It is a further object of my invention to provide an instrument which is suitable for measuring the product of electrical currents, particularly for measuring vector products, as in the case of alternating currents differing in phase relationship.

It is also an object of my invention to provide a construction which may be used not only for instruments of the product type such as wattmeters and reactive-component-of-power meters but also for dynamometer type voltmeters and ammeters.

Still another object of my invention is to construct an iron core type of dynamometer instrument in such a manner that the movable coil remains at a zero position and does not produce any torque when no current is flowing in the field coil thus obviating the necessity for auxiliary or torque compensating coils.

It is also an object of my invention to provide an alternating current instrument which is substantially free from errors, including errors such as wave form errors, for example.

Other and further objects and advantages will become apparent as the description proceeds.

In carrying out my invention in its preferred form I provide a field structure having an outer pole piece and an inner pole piece, which is very nearly surrounded by the outer pole piece and spaced to form an annular air gap 250° in length through which an eccentrically mounted coil may rotate. The inner pole piece has an opening through the center, through which passes one side of the coil together with the shaft supporting the coil. The core member including the inner pole piece is divided so as to have the general form of a U. There are arms or branches, which extend from the outer pole piece to the ends of the U to complete the magnetic circuit of the field. However, air gaps are interposed between the inner pole piece and the arms leading from the outer pole piece in order to increase the reluctance in the path of magnetic flux which tends to be produced by the movable coil. A stationary or field coil is wound around the neck or base portion of the outer pole piece. In the case of a wattmeter, for example, the field coil may be formed as a current coil and the movable coil as a potential coil of the instrument.

Figure 2:
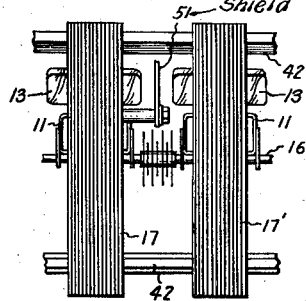
Figure 2:
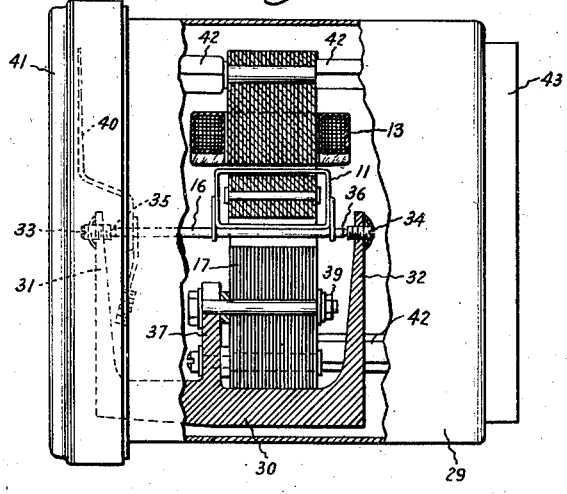
Figure 3:
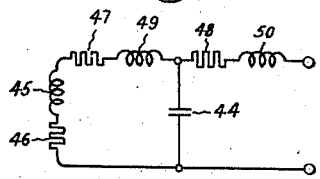

The invention may be understood more readily from the following detailed description when considered in connection with the accompanying drawing and those features of the invention which are believed to be novel and patentable will be pointed out in the claims appended hereto. In the drawing Figure 1 is a front elevation partially in section with certain portions of the apparatus broken away for the sake of clarity showing the torque producing unit of a dynamometer type instrument constructed in accordance with my invention. Figure 2 is a side elevation of the arrangement of Figure 1 also shown partially in section with a portion of the apparatus broken away. Figure 3 is a circuit diagram illustrating the arrangement for obtaining power factor compensation of the instrument and to show the phase angle effect of the losses in the iron core, and Figure 4 is an illustration of another embodiment of my invention adapted to use in polyphase alternating current circuits. Like reference characters are utilized throughout the drawing to designate like parts.

Referring more in detail to Figures 1 and 2, in the arrangement described, there is a movable coil 11 arranged to travel in an annular gap 12 which is of considerable length constituting the greater part of the periphery of a circle, for example, 270° or at least 250°, and there is a field coil 13 for producing magnetic flux across the gap 12 within which the coil 11 is arranged to travel. Although this arrangement of coils may be used for various types of dynamometer instruments such as alternating and direct current voltmeters and ammeters, for example, it is particularly useful with wattmeters and I shall describe the arrangement with particular reference to its use as a wattmeter. For this purpose it is usually most convenient to wind the movable coil 11 with relatively fine wire connected in series with a suitable multiplier or resistance coil to serve as the potential coil of the wattmeter and to wind the field coil with a suitable number of turns of heavy wire to serve as the current coil of the wattmeter.

In order to obtain a wide angle of movement of the rotatable current conducting coil 11, the field iron of the instrument is arranged with an inner annular pole piece 14 which is very nearly surrounded by an outer pole piece 15. One side of the coil 11 and the shaft 16 to which the said side of the coil 11 is secured pass through the center of the annular pole piece 14. The outer pole piece 15 is integral with a field member 17 which, in the arrangement shown, may be generally in the shape of a C with the pole piece 15 constituting a projection extending inwardly from the mid portion of the C, the projection or pole piece 15 having a circular notch therein for the inner pole piece 14. The field iron is completed by a core for the movable coil 11 formed by the core unit 18, which is generally in the shape of a U with the yoke portion forming the annular inner pole piece 14 and with leg portions 19 and 20 spaced to leave an air gap between them.

The end portions 21 and 22 of the C-shaped field 17 approach very closely to the sides of the ends 19 and 20 of the U-shaped core unit 18. Preferably the end portions of the field 17 and the core unit 18 do not come into immediate contact but leave perceptible air gaps 23 and 24 for the purpose of reducing field saturation and overcoming wave form errors of the instrument. In the preferred arrangement which I have illustrated although air gaps 23 and 24 are relatively small and less than the air gap 12 within which the outer side of the movable coil 11 travels, the air gap 12 in turn is less in length than the air gap 25 between the leg portions 19 and 20 of the U-shaped core 18.

It will be understood, of course, that the precise shapes of the field and core members are immaterial and that any shape may be employed which would provide a flux conducting path from the outer pole piece 15 to the inner pole piece 14. However, in order to avoid having the rotatable coil 11 subject to having force applied to it solely due to the action of current flowing through it, I prefer to have the core 18 constructed in some form of the nature of that shown where the portion of the material connected to the pole piece 14 is divided so as to have the air gap 25 between said divided portions, and preferably the core 18 has a relatively symmetrical configuration at least in the portion thereof close to the inner annular pole piece 14. It will be seen that in the arrangement illustrated the entire field structure is relatively symmetrical, so that flux produced by the field coil 13 mounted on the neck 26 of the pole piece 15 divides substantially equally between the branches 27 and 28 and between the leg portions 19 and 20 to the inner annular pole piece 14, where the two flux paths join, and the flux passes across the gap 12, back to the outer pole piece 15. The annular pole piece 14 may be regarded as having a gap 25' in the annulus with the core portions 19 and 20 extending from either side of said gap 25.' My invention, however, is not limited to this precise arrangement since the air gap 12 is relatively uniform and causes the flux to distribute itself substantially evenly across the length of the air gap 12.

Although I have referred to the field members as field irons it will be understood, of course, that my invention is not limited to the use of iron for the flux conducting portion of the apparatus but that any suitable material having relatively high permeability of the order of that of soft iron may be employed. In connection with alternating current instruments it will be understood, of course, that it is advantageous to have the field 17 and the core 18 constructed in the form of stacked laminations. By making the annular length of the circular opening or notch 12 in the pole piece 15 approximately 270° as shown it will be seen that even with the coil 11 of finite width a movement of the element exceeding 250° may be obtained.

The method of supporting the various parts of the apparatus will be seen more readily from Figure 2 showing an enclosing casing 29, partially broken away, in which the E-shaped frame 30 is secured for supporting the parts of the instrument. It will be seen that the frame 30 includes a pair of relatively long, narrow, upwardly extending arms 31 and 32 and, in the ends of these arms, suitable bearings or jewels 33 and 34 are mounted, which have hard surfaced cup shaped depressions in which mechanical pivot points 35 and 36 formed at the ends of the shaft 16 are permitted to rotate. A relatively wide and spreading arm or bracket 37 is provided at the intermediate portion of the frame 30 for supporting the field laminations 17 by means of suitable bolts 38. The core laminations 18 are likewise secured to the bracket 37 by means of suitable bolts 39.

A pointer 40, and if desired, a suitable damping vane, not shown, are secured to the shaft 16 and it will be understood that suitable means such as lead-in spirals, not shown, for connecting the potential terminals of the instrument to the rotatable coil 11 and a biasing spring, not shown, are also provided. The scale, not shown, for cooperation with the pointer 40, it will be understood, is to be mounted within the front cover 41 of the casing 29 and may be secured to the arm 31.

My construction lends itself to convenient and expeditious assembly. The assembly may be carried out in the following manner. After the coil 11 has been mounted upon the shaft 16 the shaft 16 may be inserted between the bearings 33 and 34 and secured by a suitable longitudinal adjustment of the bearings. By turning the coil 11 to a horizontal position core unit 18 may be slipped through the coil 11 and over the shaft 16 whereupon the core unit 18 is bolted to the bracket 37 of the frame 30. After the field coil 26 has been slipped on to the pole piece 15 and secured thereto, the field member 17 may be passed longitudinally of the shaft 16 past the arm 32 around the pole piece 14 and is also bolted to the bracket 37. It will be understood that other parts, not shown, such as the scale plate, etc., may be secured to the front bracket 31 of the frame 30 and that additional supporting posts 42 may be provided for securing the scale plate, as well as the back plate 43 of the casing 29 to the field structure for increasing the rigidity of the assembly.

If the apparatus is to be used as a voltmeter or an ammeter, it will be understood that the coils 11 and 13 may be connected in series, whereas if it is to be used as a wattmeter, the field coil 13 will be connected in series to the load directly or to a suitable transformer and the potential coil 11 will be connected between the lines of the circuit tested or between the output terminals of the potential transformer in series with a suitable multiplier resistance. Assuming that the apparatus is used as a wattmeter it will be seen that the current flowing through the field coil 13 produces a magnetic flux crossing the air gap 12 and that the current flowing through the conductors on the outer side of the coil 11 reacts with this flux to produce a torque causing the shaft 16 and the pointer 40 to deflect in opposition to the biasing spring, not shown. Since the core unit 18 is symmetrically constructed and the reactance of the current conducting coil 11 is substantially the same for any position there is substantially no tendency for the current flowing in the coil 11 to produce a torque when there is no current flowing in the field coil 13. However, there is a tendency for the current flowing through the coil 11 to cause a flux to pass through the stationary iron of the apparatus, up one leg 19 of the U shaped core unit 18, down leg 20, through the branch 28, and down branch 27 to the end of the core unit 18, or vice versa. This flux, however, serves no particular purpose as it is only the flux from the coil 11 crossing the air gap 12 and reacting with the torque produced by the coil 13 that produces torque. If the idle flux produced by the coil 11, however, should be excessive it would tend to increase the inductance and decrease the power factor of the potential circuit and might also produce saturation effects which, in turn, may lead to wave form errors. To obviate this tendency the air gaps 23 and 24 are provided between the end portions 21 and 22 of the field member 17 and portions 19 and 20 of the core unit 18.

The use of iron cores in precision instruments such as wattmeters may introduce some power factor errors due to the hysteretic angle of advance or the phase displacement, produced by the iron losses, between the actual current flowing in the coils and the component thereof serving as a magnetizing current. If it is desired to compensate for such errors a compensating condenser 44 may be provided as shown in Figure 3. In Figure 3 the inductance 45 represents the potential coil 11, resistance 46 represents the inherent resistance of the potential coil, the resistances 47 and 48 represent two sections of series connected resistance spools or multipliers to limit the current to a suitable value, and the inductances 49 and 50 represent the unavoidable inductances of the resistance spools 47 and 48. It will be seen that the compensating condenser 44 is connected from a point on one side of the coil 45 to a point between sections of the current limiting resistances 47 and 48.

Although in discussing the use of my apparatus as a wattmeter, I have described an instrument which would serve as a single phase wattmeter, it will be understood that my invention is not limited to this precise arrangement and that by placing a number of units in line with the rotatable coils placed on a common shaft and with magnetic shields, if desired, between adjacent field coils, my invention may be used in connection with polyphase circuits. In Figure 4 a two unit arrangement is shown which may be used as a two or three phase wattmeter in the well known manner. The fields 17 and 17' are shown bolted in tandem cooperating with the common shaft 16. To guard against interaction between the field coils, a shield 51 is provided which may be composed of a plate or a stack of laminations composed of relatively permeable magnetic material.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A long range wattmeter comprising a laminated field member composed of relatively permeable magnetic material, a field coil, a laminated core and a movable coil, said field member being in generally C-shape with an inwardly extending projection added at the mid portion of the C, said projection having a substantially circular notch therein open at the end of the projection, said field coil surrounding said projection at the neck thereof, said core being in general U-shape with a substantially circular edged yoke portion fitting into the notch in said field projection and spaced from the edges thereof to form a substantially uniform air gap for the movable coil, said latter coil linking the said circular edged portion of said core and being eccentrically mounted to rotate about an axis extending through the yoke portion of said U-shaped core and substantially concentric with the circular edge thereof, said coil having one edge adjacent said axis and the opposite edge in said air gap, said U-shaped core having leg portions extending adjacent the end portion of the C-shaped field member and spaced therefrom to form perceptible air gaps.

2. A long range wattmeter comprising a magnetic flux conducting field structure having an inner pole piece substantially annular in shape surrounded by an outer pole piece and flux paths joining said pole pieces, said pole pieces being spaced to form an annular air gap therebetween, a field coil linking the flux paths between said pole pieces and a rotatable coil eccentrically mounted with respect to its axis of rotation and with one side thereof passing through said annular inner pole piece and with the other side passing through and adapted to travel in said air gap, the annular pole piece having flux conducting portions attached thereto to form a relatively symmetrical core divided into two portions with an air gap therebetween, the external magnetic circuit between said pole pieces having an air gap interposed therein of less length than the coil-receiving air gap between the pole pieces, and the air gap between the portions of the core being greater in length than the air gap between the pole pieces.

3. A long range dynamometer instrument comprising a field structure including a pair of pole pieces with an annular air gap therebetween and portions joining said pole pieces to form a magnetic circuit completed by passage of flux across said air gap, at least one of said pole pieces being substantially annular in shape with a gap therein with branched circuit portions extending from the annular pole piece from either side of the gap therein to the flux conducting portion of the field structure, a field coil wound on the other of said pole pieces, and a coil linking said annular pole piece with one side passing through it and an axis of rotation passing through said annular pole piece.

4. A long range polyphase dynamometer instrument comprising a plurality of field structures each including a pair of pole pieces with annular air gaps therebetween, and portions joining said pole pieces to form magnetic circuits completed by passage of flux across said air gaps, a plurality of field coils each carried by one of said field structures and linking it, at least one of each of said pairs of pole pieces being substantially annular in shape with a gap therein, with branched circuit portions extending from the annular pole piece from either side of the gap therein to the flux conducting portion of the corresponding field structure, said field structures being mounted one in front of the other with said annular pole pieces substantially coaxial, and a plurality of mechanically connected movable coils each linking one of said annular pole pieces with one side passing through the pole piece and having an axis of rotation passing through said annular pole pieces.

5. A long range dynamometer instrument comprising a magnetic flux-conducting field structure including a pair of pole pieces with an annular air gap therebetween and portions joining said pole pieces to form a magnetic circuit completed by passage of flux across said air gap, a field coil linking said field structure, at least one of said pole pieces being substantially annular in shape with a gap therein with branched circuit portions extending from the annular pole piece from either side of the gap therein to the flux conducting portion of the field structure, and a coil linking said annular pole piece with an axis of rotation passing through said annular pole piece and a side adapted to sweep through the air gap between pole pieces, the external magnetic circuit in said field structure between said pole pieces having an air gap interposed therein of less length than the coil-receiving air gap between the pole pieces.

ALMON J. CORSON.